H. R. Hoskins,

Gate.

No. 110,363. Patented Dec. 20, 1870.

United States Patent Office.

HENRY R. HOSKINS, OF HARLAN, INDIANA.

Letters Patent No. 110,363, dated December 20, 1870.

IMPROVEMENT IN GATES.

The Schedule referred to in these Letters Patent and making part of the same.

*To all whom it may concern:*

Be it known that I, HENRY R. HOSKINS, of Harlan, in the county of Allen and State of Indiana, have invented a new and useful Improvement in Gates; and I do hereby declare that the following is a full, clear, and exact description thereof, which will enable others skilled in the art to make and use the same, reference being had to the accompanying drawing forming part of this specification.

My invention relates to suspended and horizontally-sliding gates, and consists in combining therewith a pair of yokes which actuate, support, and guide the said gate, as more particularly described hereinafter.

Similar letters of reference indicate corresponding parts.

Figure 1:
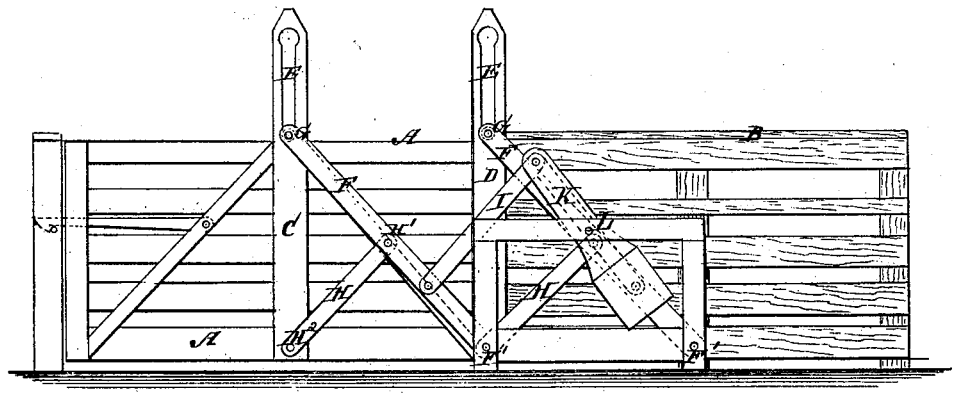
Figure 1 is a side elevation of my improved gate when closed.
Figure 2:
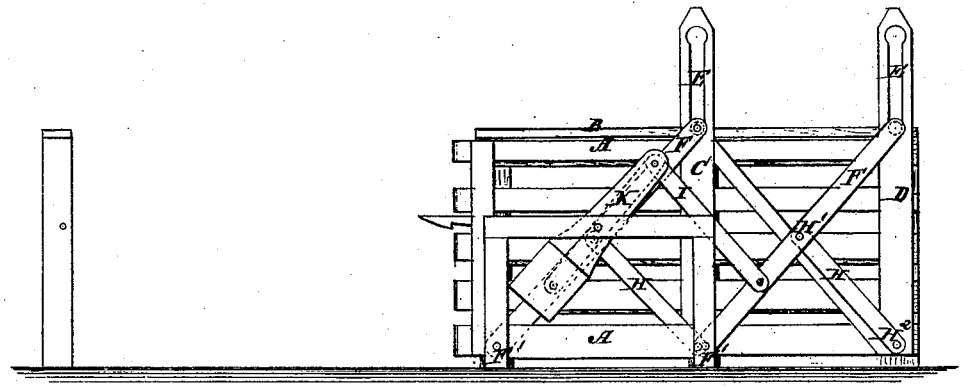
Figure 2 is a side elevation when open.

A is the gate, and B the section or panel of the fence along which the gate slides or moves in opening and closing.

C and D represent vertical bars attached to the gate, one at the center and the other at the rear end, which rise considerably above the top, and have vertical slots E in the upper parts.

F represents pins or bars nearly as long as the bars C D, pivoted near the ground—one pair at the front end of the panel B of the fence and the other as far back as the distance between the bars C D, and as near the path of the gate as may be, and let it pass between the bars of each pin. These bars carry rollers G on studs at the sides next the gate, near the top, which rollers work in the slots E.

H represents short bars or connecting-links, about half the length of the bars F pivoted to the bars C, one to each, at the bottom, and jointed to the long bars F at or about the center.

I represents a pair of bars jointed together at one end in the form of an isosceles triangle, and jointed at the lower ends of the two sides to the bars F on one side of the gate, a short distance below the joints of the bars H with the said bars.

K is a weighted lever jointed to these bars I, where they are jointed together, or at the apex of the triangle, and pivoted at L to any suitable support rising up from the ground. This pivot L is arranged at about the center of the front half of the panel B, which is also about the center of the space between the bottom pivots F' of the bars F. The gate is therefore suspended on the bars F, and is carried past their pivot centers F' on the bars H. These bars, together with the rollers G at the top of the bars F, prevent the gate from tilting endwise on the bars F, and the weighted lever K holds the bars F from sagging by the weight of the gate when the gate is shut either way beyond the pivot centers F'.

By this arrangement the gate moves with but very little friction, and it does not rise and fall, owing to the compensating action of the movements of the pivot-points $H^1$ and $H^2$ moving in equal arcs, reversed as to each other.

It will be perceived, also, that the yokes pivoted to the adjacent fixed panel, support the gate by means of the straps H, embrace and guide it as they travel in the slots E, and actuate it whenever moved on their pivots.

I am aware of the sliding gate patented February 4, 1868, to J. Atkins, and therefore desire explicitly to disclaim any part or device thereof as any part of my invention.

Having thus described all that is necessary to a full understanding of my invention,

What I esteem to be new, and desire to protect by Letters Patent, is—

The lever-yokes F, pivoted to the bottom of panel B, embracing the gate on each side, and moving in the slots E to guide it, actuating and supporting it by the straps H, and operated by a weighted lever and strap K I, all as and for the purpose described.

HENRY R. HOSKINS.

Witnesses:
SOLMON BENINGHOFF,
FREDRICK BOTTERON.